United States Patent [19]

Haynes et al.

[11] 4,094,851

[45] June 13, 1978

[54] METHOD OF PREPARATION OF CLEAR CONCENTRATE COMPOSITIONS

[75] Inventors: Richard T. Haynes, Kirkwood; Harry L. Young, Rock Hill, both of Mo.

[73] Assignee: Monsanto Company, St. Louis, Mo.

[21] Appl. No.: 583,327

[22] Filed: Jun. 3, 1975

Related U.S. Application Data

[63] Continuation-in-part of Ser. No. 407,372, Oct. 17, 1973, abandoned, which is a continuation-in-part of Ser. No. 274,156, Jul. 24, 1972, abandoned, which is a continuation of Ser. No. 770,088, Oct. 23, 1978, abandoned.

[51] Int. Cl.² .......................... C08K 5/01; D06P 1/00
[52] U.S. Cl. ................... 260/33.6 UA; 260/29.6 RB; 260/29.6 RW; 260/29.6 HN; 260/29.6 MN; 260/DIG. 38; 427/288; 427/390 R; 428/265; 428/267

[58] Field of Search ...... 260/33.6 UA, 34.2, 29.6 RB, 260/29.6 AN, 29.6 RW, 29.6 MN, DIG. 38, 29.7 N; 427/390 R, 288; 428/265, 267

[56] References Cited

U.S. PATENT DOCUMENTS

| | | | |
|---|---|---|---|
| 2,364,692 | 12/1944 | Cassel .................................. | 260/34.2 |
| 2,416,620 | 2/1947 | Gans et al. ................... | 260/DIG. 38 |
| 2,663,696 | 12/1953 | Armatys ..................... | 260/DIG. 38 |
| 3,165,486 | 1/1965 | Johnson .......................... | 260/29.7 R |
| 3,223,663 | 12/1965 | Altobelli et al. ................ | 260/28.5 B |

*Primary Examiner*—Allan Lieberman
*Attorney, Agent, or Firm*—William H. Duffey

[57] ABSTRACT

Clear concentrate compositions suitable for dilution to form a cut clear without need for neutralization following dilution are prepared by (1) admixing a bonding agent, a wetting agent, an organic solvent and a thickening agent, the thickening agent comprising a crosslinked olefin-maleic anhydride interpolymer and (2) neutralizing the undiluted admixture with an acyclic or heterocyclic monoamine.

11 Claims, No Drawings

METHOD OF PREPARATION OF CLEAR CONCENTRATE COMPOSITIONS

This is a continuation-in-part of application Ser. No. 407,372 filed Oct. 17, 1973 which is a continuation-in-part of application Ser. No. 274,156 Jul. 24, 1972 which in turn is a continuation of application Ser. No. 770,088 filed Oct. 23, 1968, all now abandoned.

BACKGROUND OF THE INVENTION

This invention relates to compositions utilized in textile printing. More particularly, the invention relates to clear concentrate compositions which are diluted to provide a clear vehicle or "cut clear" for cutting color concentrates to form a print paste.

The decoration of textiles with print pastes comprising a pigment dispersed in a thickened aqueous solution or dispersion of polymeric materials which insolubilize upon curing to bind the pigment to the textile is well-known.

The print paste is generally prepared from a color concentrate which contains relatively high concentrations of pigment dispersed in a vehicle comprising water, reactive thickeners and dispersing agents which insolubilize when the composition is cured. Such color concentrates are described, for example, in U.S. Pat. No. 3,223,663. In order to obtain a print paste having the desired depth of shade, it is conventional practice to "cut" the color concentrate with a clear (unpigmented) vehicle. The clear vehicle is commonly prepared by the textile printer from a clear concentrate comprising a bonding resin, a wetting agent, a thickening agent and sufficient organic solvent (generally 5% to 50% by weight) to provide a viscosity which permits the compositions to be readily pumped and stirred. The clear concentrate is diluted by admixing with water and an organic solvent and is then neutralized with ammonia to form the clear vehicle. the neutralization step is required in order to provide requisite high viscosity. Prior to neutralization, the clear vehicle is unusably thin.

Unfortunately, ammonia fumes associated with the neutralization step discussed above often cause severe personnel discomfort. Obviously, a clear concentrate not requiring neutralization after dilution would represent a significant advance in printing technology.

SUMMARY OF THE INVENTION

It is an object of this invention to provide a neutralized clear concentrate which can be diluted to produce a clear vehicle for admixture with color concentrates to form print pastes.

This object is achieved with a composition comprising conventional bonding resins, wetting agents and solvents, and a cross-linked olefin-maleic anhydride interpolymer, which composition is neutralized with an organic amine. The neutralized clear concentrate composition affords the desired high viscosity upon dilution.

The invention will be better understood from the description of the preferred embodiments.

DESCRIPTION OF THE PREFERRED EMBODIMENTS

As indicated above, the clear concentrates of this invention are typically those comprising a bonding resin, a wetting agent, a thickening agent and an organic solvent. Clear concentrates of this type are well-known to those skilled in the textile printing art. In certain cases, however, the clear concentrate does not include a bonding agent. Instead, the binder is added later in the printing process. Such clear concentrates are still within the present scope.

It has been unexpectedly found that when an amineneutralized clear concentrate, as hereinafter described, is employed, dilution of the concentrate with a mixed aqueous-organic solvent such as commonly employed, for example, a mixture of Varsol (a petroleum hydrocarbon solvent having a boiling range of 151°-201° C. and a kauri-butanol value of 33-35) and water produces a cut clear having suitable viscosity for admixture with color concentrates to form print pastes. This result is most surprising in view of the fact that it is know that such dilution of a clear concentrate preneutralized, for example, with ammonia or amines other than those hereinafter specified results in formation of a watery cut clear of unusably low viscosity. Prior to this invention, it was considered essential to dilute the clear concentrate before neutralization in order to obtain a suitable cut clear.

The thickening agents suitable for use in the improved clear concentrates of this invention are cross-linked interpolymers of maleic anhydride and a $C_2$-$C_4$ olefin, i.e., ethylene, propylene, n-butylene or isobutylene. The preferred olefin is ethylene.

Many cross-linking agents are known for use in the production of cross-linked $C_2$-$C_4$ olefin-maleic anhydride interpolymers. Vinyl esters of crotonic acid such as vinyl crotonate have found considerable utility as cross-linking agents for ethylene-maleic anhydride interpolymers. Another useful cross-linker for ethylene-maleic anhydride interpolymers is triallyl isocyanurate, particularly if present in about 0.35 to about 0.55 mol percent based upon the maleic anhydride monomer.

Further examples of suitable cross-linking agents useful herein include vinyl esters of an olefinically unsaturated carboxylic acid having from 3 to 24 carbon atoms such as acrylic acid, methylacrylic acid, isocrotonic acid, vinyl acetic acid, 2-pentenoic acid, 3-methyl-2-hexenoic acid, 2-hexenoic acid, 2-heptenoic acid, 4-ethyl-2-octanoic acid, 2-nonenoic acid, 9-decylenic acid, stilingic acid, 9-dodecylenic acid, palmitoleic acid, oleic acid, ricinoleic acid, petroselenic acid, vaccenic acid, linoleic acid, lynolenic acid, eleostearic acid, licanic acid, parinaric acid, gadoleic acid, arachidonic acid, cetoleic acid, erucic acid, nervonic acid, etc. Other suitable vinyl ester cross-linking agents are the vinyl or divinyl esters of unsaturated dicarboxylic acids such as vinyl maleate, divinyl maleate, vinyl fumarate, divinyl fumarate, vinyl itaconate, divinyl itaconate, vinyl citriconate, divinyl citriconate, vinyl mesaconate, divinyl mesaconate, vinyl glutaconate, divinyl glutaconate, and the like.

The organic amine utilized for neutralization of the clear concentrated composition is selected from the group consisting of acyclic primary monoamines, for example, allyl amine, n-amyl amine, isoamyl amine, n-methyl butyl amine, 1-amino-3-methyl butane; and heterocyclic monoamines such as pyrroline and pyrrolidine, said organic amines having a boiling point less than 100° C. Selection of the amine from the foregoing group is essential to the successful practice of this invention. For example, if diamines, e.g., ethylene diamine, or acyclic secondary amines, e.g., diethyl amine, are used for neutralization of the clear concentrate, the cut clear produced by dilution thereof will not have sufficiently high viscosity.

remaining ingredients and proportions thereof were the same as in Example I.

TABLE 1

| Example | Thickening agent | Amine | pH | As is viscosity of cut-clear (cps) |
|---|---|---|---|---|
| II | 24.6 parts vinyl crotonate cross-linked ethylene-maleic anhydride polymer having a solution viscosity of 125,000 cps. | 30 parts allyl amine | 8.0 | 28,000 |
| III | 24.6 parts of agent used in Example II. | 18.2 parts n-methylbutyl amine | 8.4 | 24,000 |
| IV | 30.0 parts of agent used in Example II. | 23.0 parts n-butylamine | 8.1 | 15,000 |
| V | 30.0 parts of agent used in Example II. | 23.0 parts pyrrolidine | 8.0 | 41,000 |
| VI | 24.6 parts vinyl crotonate cross-linked ethylene-maleic anhydride polymer having a solution viscosity of 160,000 cps. | 15.5 parts allyl amine | 8.0 | 23,000 |

A particularly preferred thickening agent is a vinyl crotonate cross-linked ethylene-maleic anhydride interpolymer having a viscosity in centipoises of from 100,000 to 200,000 (as measured on a 1% by weight aqueous solution at a pH of 9 with a Brookfield RVT viscometer using a number 6 spindle at 5 RPM) and neutralized with n-methyl butyl amine.

The clear concentrates of this invention can be conveniently prepared by admixing the wetting agent, unneutralized, cross-linked olefin-maleic anhydride interpolymer, optionally a bonding agent, and sufficient organic solvent to render the composition readily stirrable. The organic amine neutralizing agent is then added to the mixture in sufficient amount that the pH of a 1% aqueous dispersion of the concentrate is greater than 7.

Choice of the particular bonding resin, wetting agent, solvent, and if desired, supplemental additives such as anticrock agents to be employed with the thickening agent and the relative proportions of these ingredients is determined in accordance with the conventional practices of the textile printing art.

The invention is further illustrated by the following examples wherein all proportions are by weight unless otherwise specified. In the examples and claims, the term solution viscosity refers to viscosity of a 1% by weight solution adjusted to a pH of 9 as measured with a Brookfield RTV viscometer using a number 6 spindle at 5 RPM. The term "as is" viscosity refers to viscosity of undiluted material as measured with a Brookfield LVT viscometer using a number 4 spindle at 6 RPM.

EXAMPLE I

About 36 parts Solvesso 100 (a petroleum hydrocarbon having a boiling range of 160°–182° C. and a kauri-butanol value of about 93); 25 parts Cycopol S-101-1 bonding resin (a 50% solution in petroleum spirits of styrenated alkyd resin); 12.4 parts of sodium lauryl sulfate (wetting agent); 0.4 parts morpholine and 18.5 parts of vinyl crotonate cross-linked ethylene-maleic anhydride polymer having a solution viscosity of 120,000 cps were admixed. About 16 ml. of allyl amine were then added to the mixture. The clear concentrate thus formed had a pH (as measured in 1% dispersion in $H_2O$) of about 7.7. A cut clear was formed by admixing about 20.6 parts of the clear concentrate with about 445.6 parts water and 285.6 parts varsol. The cut clear had an as is viscosity of about 16,000 cps.

EXAMPLES II–VI

Additional clear concentrates and cut clears were prepared as in Example I using various thickening agents and amines as indicated in Table 1 below. The The embodiments of this invention in which an exclusive property or privilege is claimed are defined as follows:

1. In a method for preparing a clear concentrate composition useful in forming a clear vehicle for cutting color concentrates wherein a bonding agent, a wetting agent, an organic solvent in 5 percent to 50 percent by weight of said composition, and a thickening agent are admixed to form said clear concentrate composition, said thickening agent comprising a $C_2$–$C_4$ olefin-maleic anhydride interpolymer cross-linked with a cross-linking agent selected from the group consisting of a vinyl ester of an olefinically unsaturated carboxylic acid having from 3 to 24 carbon atoms and about 0.35 to about 0.55 mol percent of triallyl isocyanurated based upon the maleic anhydride monomer, the improvement which comprises neutralizing said clear concentrate composition, prior to further dilution, to a pH greater than 7, as measured by a 1% aqueous dispersion of said clear concentrate composition, with an organic amine selected from the group consisting of acyclic primary monoamines and heterocyclic monoamines, said organic amines having a boiling point less than 100° C.

2. A method of claim 1 wherein said interpolymer is ethylene-maleic anhydride.

3. A method of claim 2 wherein the vinyl ester is vinyl crotonate.

4. A method of claim 1 wherein said organic amine is pyrrolidine.

5. A method of claim 1 wherein said organic amine is allyl amine.

6. A method of claim 1 wherein said organic amine is an amyl amine.

7. A method of claim 1 wherein said organic amine is n-methyl butyl amine.

8. A method of claim 1 wherein said organic amine is 1-amino-3-methyl butane.

9. In a method for preparing a clear concentrate composition useful in forming a clear vehicle for cutting color concentrates wherein a wetting agent, an organic solvent in 5 percent to 50 percent by weight of said composition, and a thickening agent are admixed to form said clear concentrate composition, said thickening agent comprising a $C_2$–$C_4$ olefinmaleic anhydride interpolymer cross-linked with a cross-linking agent selected from the group consisting of a vinyl ester of an olefinically unsaturated carboxylic acid having from 3 to 24 carbon atoms and about 0.35 to about 0.55 mol percent of triallyl isocyanurate based upon the maleic anhydride monomer, the improvement which comprises neutralizing said clear concentrate composition, prior to further dilution, to a pH greater than 7, as measured by a 1% aqueous dispersion of said clear concentrate composition, with an organic amine selected from the group consisting of acyclic primary monoamines and heterocyclic monoamines, said organic amines having a boiling point less than 100° C.

10. A method of claim 9 wherein said interpolymer is ethylene-maleic anhydride.

11. A method of claim 10 wherein the vinyl ester is vinyl crotonate.

* * * * *